United States Patent
Satapathy et al.

(10) Patent No.: US 10,298,468 B2
(45) Date of Patent: May 21, 2019

(54) PROVISIONING PERSISTENT, DYNAMIC AND SECURE CLOUD SERVICES

(71) Applicant: Intel Corporation, Santa Clara, CA (US)

(72) Inventors: Jiphun C. Satapathy, Portland, OR (US); Sharad K. Garg, Portland, OR (US); Aakash Bhumbla, Hillsboro, OR (US); Aaron R. Berck, Portland, OR (US); Neena Maldikar, Hillsboro, OR (US); James R. Quaranta, Jr., San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 417 days.

(21) Appl. No.: 14/158,785

(22) Filed: Jan. 18, 2014

(65) Prior Publication Data
US 2015/0207697 A1    Jul. 23, 2015

(51) Int. Cl.
| | |
|---|---|
| G06F 15/16 | (2006.01) |
| H04L 12/24 | (2006.01) |
| G06F 8/61 | (2018.01) |
| G06F 9/50 | (2006.01) |
| G06F 21/57 | (2013.01) |
| H04L 29/06 | (2006.01) |

(52) U.S. Cl.
CPC ............ *H04L 41/5041* (2013.01); *G06F 8/61* (2013.01); *G06F 9/5072* (2013.01); *G06F 21/57* (2013.01); *H04L 67/42* (2013.01)

(58) Field of Classification Search
CPC ....... H04L 63/10; H04L 63/102; H04L 63/20; H04L 47/14; H04L 41/5041; H04W 12/08; G06F 17/30; G06F 21/44; G06F 21/45
See application file for complete search history.

(56) References Cited

U.S. PATENT DOCUMENTS

| | | | | |
|---|---|---|---|---|
| 2003/0051235 A1* | 3/2003 | Simpson | .................. | G06F 8/60 717/174 |
| 2006/0150256 A1* | 7/2006 | Fanton | .................... | G06F 21/10 726/27 |
| 2006/0272020 A1* | 11/2006 | Gardner | ................ | G06F 9/4411 726/23 |

(Continued)

OTHER PUBLICATIONS

European Search Report for EP Patent Application No. 14194772.1, dated Mar. 11, 2015, 8 pages.

(Continued)

*Primary Examiner* — Joseph E Avellino
*Assistant Examiner* — Rachel J Hackenberg
(74) *Attorney, Agent, or Firm* — Jordan IP Law, LLC

(57) ABSTRACT

Systems and methods may provide for confirming, by a loader module having administrative rights with respect to a computing device, the operability of an activator module on the computing device. Additionally, the activator module may be used to manage an installation status of one or more service agents or software components on the computing device and making them persistent. In one example, confirming the operability of the activator module includes conducting a presence verification and/or authentication of the activator module, wherein a replacement activator module may be downloaded to the computing device if the presence verification and/or authentication is unsuccessful.

19 Claims, 6 Drawing Sheets

(56) References Cited

U.S. PATENT DOCUMENTS

| | | |
|---|---|---|
| 2010/0058330 A1 | 3/2010 | DeHaan |
| 2010/0250907 A1 | 9/2010 | DeHaan |
| 2011/0137979 A1* | 6/2011 | Seo ................. G06F 9/4411 709/203 |
| 2011/0184993 A1 | 7/2011 | Chawla et al. |
| 2012/0124160 A1* | 5/2012 | Shon ................. H04L 67/306 709/217 |
| 2013/0247136 A1 | 9/2013 | Chieu et al. |
| 2014/0082602 A1* | 3/2014 | Mallur ................. G06F 8/65 717/171 |
| 2014/0280913 A1* | 9/2014 | Karren ................. H04W 4/001 709/224 |

OTHER PUBLICATIONS

Office Action for European Patent Application No. 14194772.1, dated Jan. 27, 2017, 5 pages.

* cited by examiner

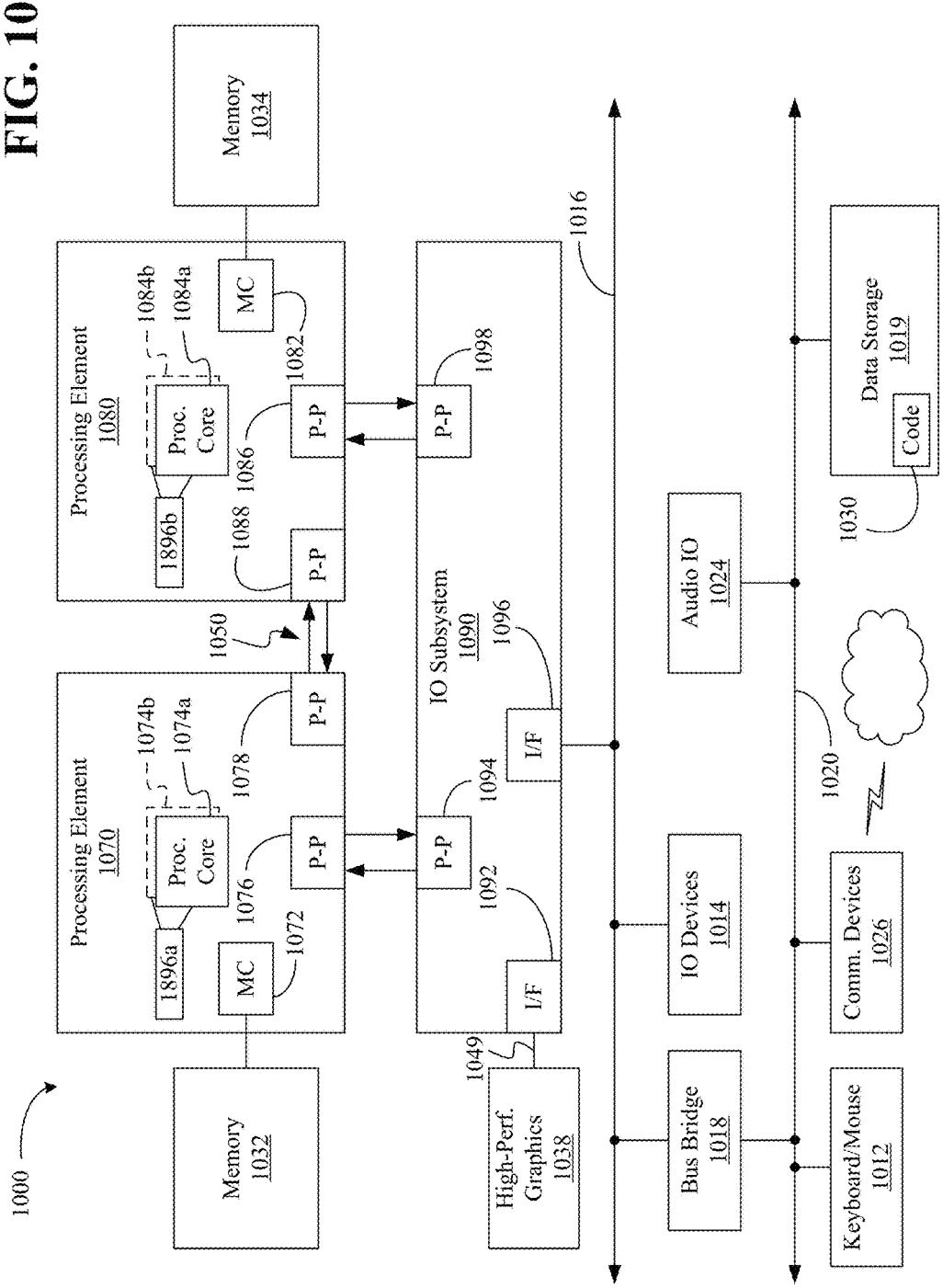

PROVISIONING PERSISTENT, DYNAMIC AND SECURE CLOUD SERVICES

TECHNICAL FIELD

Embodiments generally relate to provisioning cloud based services on computing devices. More particularly, embodiments relate to the provisioning of persistent, dynamic and secure cloud services on computing devices.

BACKGROUND

K-12 (kindergarten through twelfth grade) education systems in developing countries may be experiencing advancements and technological changes in which students are provided access to ruggedized client devices such as, for example, laptop computers, tablet computers and convertible tablets for educational purposes. In addition, cloud based services such as, for example, platform management, mobile device management (MDM), single sign-on (SSO), web filtering and theft protection services may be provisioned on the client devices in order to enhance security, prevent unauthorized usage, and so forth.

In a typical educational scenario in a developing country, the Ministry of Education (MoE) and/or certain school districts might acquire large quantities of the devices, which may not be widely available on the open market, and distribute them to the students while maintaining ownership of the devices. Moreover, the MoE may select the services to be provisioned on the devices based on the particular needs of the educational community. For example, the MoE may activate (e.g., turn on) MDM services on all machines belonging to a certain middle school and activate theft protection services on the devices distributed to grade ten of a certain high school. Similarly, the MoE may be able to deactivate (e.g., turn off) certain services on a group of devices.

Although the end users of the devices typically do not own the devices, they may have administrative rights. In this regard, end users may deactivate, delete, prevent installation or otherwise disable operation of cloud based services on the devices without authorization of the MoE. For example, an end user may spoof the media access control (MAC) of a client device so that during downloading, installation or usage of a service, an authentication error may occur and render the service unusable.

BRIEF DESCRIPTION OF THE DRAWINGS

The various advantages of the embodiments will become apparent to one skilled in the art by reading the following specification and appended claims, and by referencing the following drawings, in which:

FIG. 10 is a block diagram of an example of a system according to an embodiment.

DESCRIPTION OF EMBODIMENTS

Figure 1:
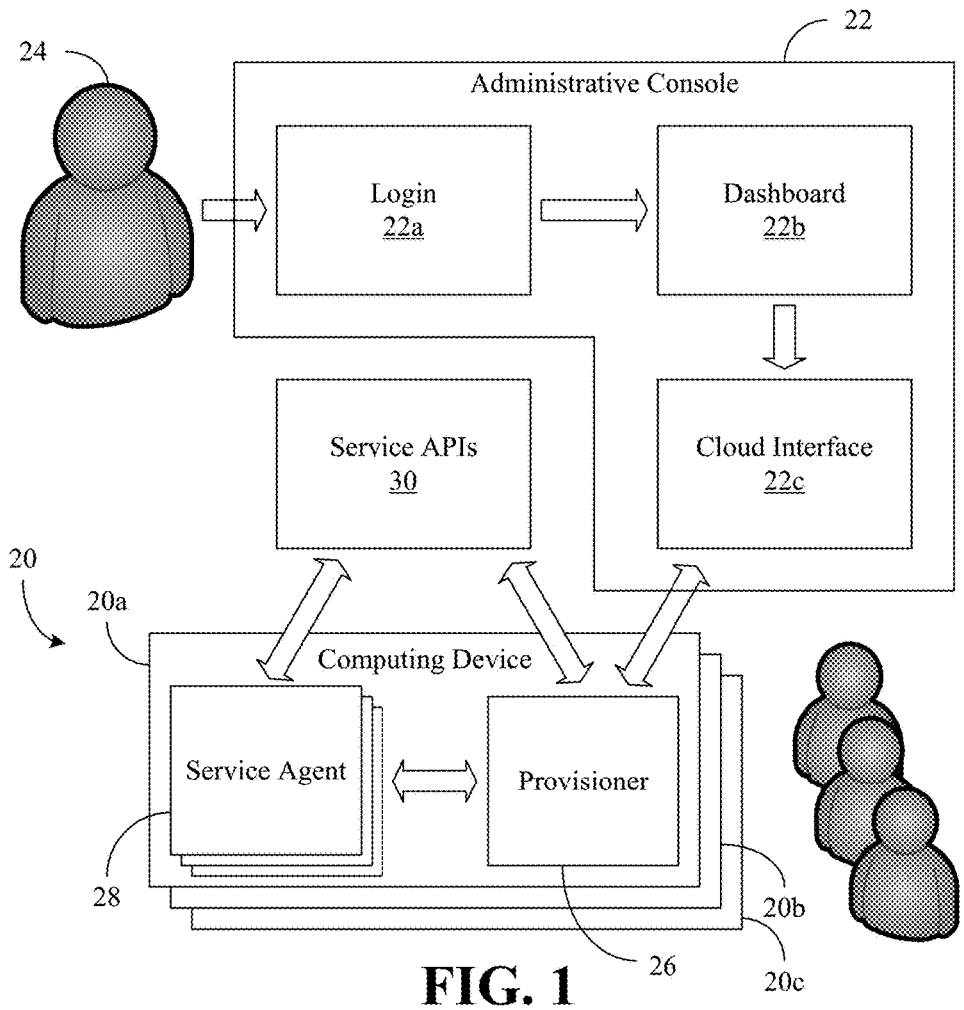
FIG. 1 is a block diagram of an example of a provisioning approach for cloud based services according to an embodiment.

Turning now to FIG. 1, an approach to provisioning cloud based services on a plurality of computing devices 20 (20a-20c) is shown in which an administrative console 22 (22a-22c, e.g., running on a backend server, not shown) is used to dynamically select the services in real-time. In the illustrated example, administrative personnel 24 (e.g., Ministry of Education/MoE, school district, corporation and/or other organizational representatives) enter authentication information into a login page 22a of the console, wherein a dashboard 22b enables the administrative personnel 24 to browse through a variety of services such as, for example, platform management, mobile device management (MDM), single sign-on (SSO), web filtering and/or theft protection services for provisioning on the computing devices 20. The console 22 may also include a cloud interface 22c to facilitate the transfer (e.g., via representational state transfer/REST application programming interface/API) of service information, status updates, and so forth, between the console 22 and the computing devices 20, which may include client devices such as desktop computers, laptop computers, tablet computers, convertible tablets, mobile Internet devices (MIDs), personal digital assistants (PDAs), smart phones, wearable computers, media players, etc., or any combination thereof.

Each computing device 20 may generally include a provisioner 26 that is configured to identify selected services via communications with the cloud interface 22c of the administrative console 22 as well as dynamically manage the download of one or more service agents 28 corresponding to the selected services on demand. The selected services may be specified by uniform resource identifier (URI) or other suitable network based identification technique/protocol. In the illustrated example, the provisioner 26 communicates with one or more third party service APIs 30 (e.g., running on one or more third party remote servers, not shown) in order to manage the download of the service agents 28 to the computing devices 20. As will be discussed in greater detail, communications between the provisioner 26 and the cloud interface 22c may be conducted via a secure sockets layer (SSL) or other secure connection. Additionally, communications between the provisioner 26 and the service APIs 30 may be conducted by an SSL or other secure connection.

Figure 2:
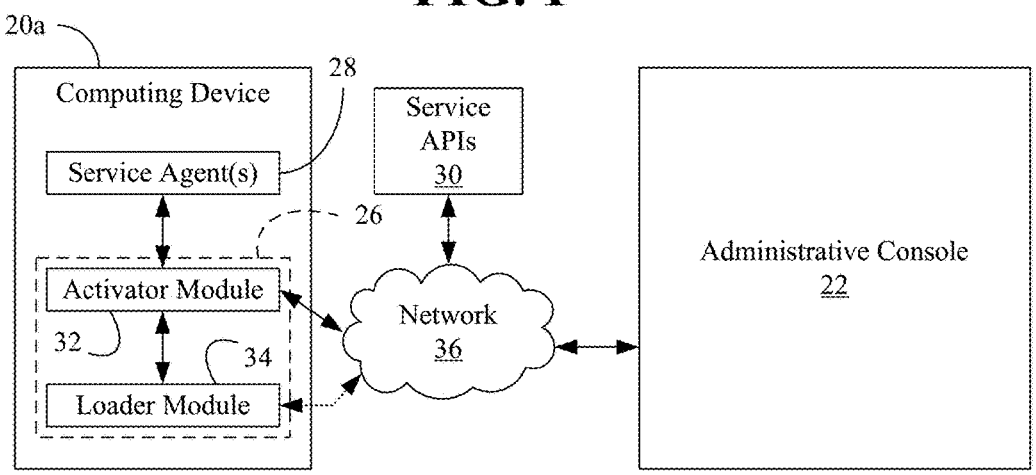
FIG. 2 is a block diagram of an example of a provisioner according to an embodiment.

FIG. 2 shows an example in which the provisioner 26 of the computing device 20a includes an activator module 32 and a loader module 34 having administrative rights with respect to the computing device 20a. The loader module 34 may be a persistent agent that cannot be removed from the device 20a, and the administrative rights may include the highest level of privileges such as, for example, protection ring zero privileges afforded to system applications. In addition, the loader module 34 may be shipped as part of the factory image of the computing device 20a. Incorporating the loader module 34 into the factory image of the computing device 20a may enable the loader module 34 be invoked during early stage boot processes and substantially enhance security. The factory image may also include the activator module 32.

The loader module 34 may generally confirm the operability of the activator module 32, and use the activator module 32 to install the service agents 28 on the computing device 20a. More particularly, the activator module 32 may receive notifications from the administrative console 22 over a network 36, wherein the notifications may identify the selection of the service agents 28 for download. The activator module 32 may identify itself to the administrative console 22 via device MAC address, serial number, etc. The illustrated activator module 32 also communicates with the service APIs 30 over the network 36 (or other suitable network) in order to download the service agents 28 to the computing device 20a.

Thus, the activator module 32 may listen to system administrator console commands from a backend server, wherein the commands might be "activate machine X for service Y", "deactivate machine X for service Y", etc. Once the activator module 32 has been notified that the computing device 20a has been selected to activate a particular service, the activator module 32 may download appropriate service-specific components such as the service agents 28 from a known location such as the service APIs 30. Similarly, the activator module 32 may deactivate service agents on the computing device 20a based on notifications from the administrative console 22. As will be discussed in greater detail, the loader module 34 may also keep the activator module 32 alive on the computing device 20a.

The activator module 32 may therefore be responsible for downloading the service agents 28 and initiating service activation processes on the remote servers running the service APIs 30. To prevent users from uninstalling the service agents 28, the activator module 32 may periodically check the state of the service agents. If a service agent 28 is missing or not running, the activator module 32 may re-install and re-start the impacted service agent 28.

The activator module 32 may implement various security measures to confirm the integrity of the service agents 28 and further enhance security. For example, the activator module 32 may create a hash of the service agents 28 and match the computed hash with corresponding hash information received from the backend server running the administrative console 22. Moreover, the activator module 32 may compare the size of the bytes of each service agent 28 with the corresponding size information received from the backend server. Additionally, all transactions between the activator module and the backend and/or third party remote servers may be conducted over SSL, as already noted. The activator module 32 may also use server SSL certificate pinning to ensure that the activator module 32 only communicates with trusted servers.

Figure 3:
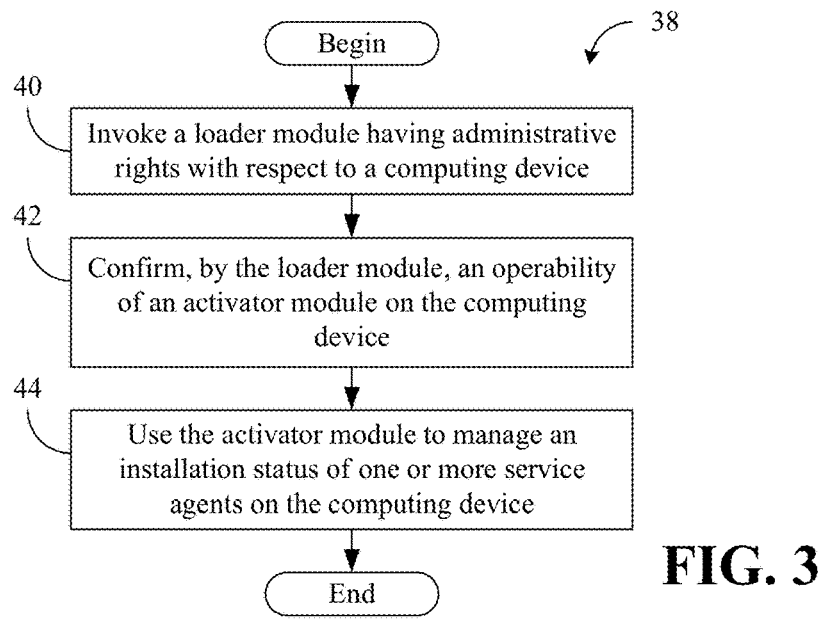
FIG. 3 is a flowchart of an example of a method of provisioning one or more services on a computing device according to an embodiment.

Turning now to FIG. 3, a method 38 of provisioning one or more services on a computing device is shown. The method 38 may be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 38 may be written in any combination of one or more programming languages, including an object oriented programming language such as Java, Smalltalk, C++ or the like and conventional procedural programming languages, such as the "C" programming language or similar programming languages.

Illustrated processing block 40 provides for invoking a loader module having administrative rights with respect to the computing device. Block 42 may confirm, by the loader module, an operability of an activator module on the computing device. As will be discussed in greater detail, block 42 may take into consideration the presence and/or authentication credentials of the activator module. The activator module may be used at block 44 to install one or more service agents on the computing device. The method 38 may function without end user intervention. Indeed, the method 38 may operate without end user awareness (e.g., in the background) of the proper service agents being maintained on the computing device despite end user attempts to disable those agents. In this regard, the illustrated approach may enable stealth monitoring and reporting of unauthorized usage of computing devices by end users.

Figure 4:
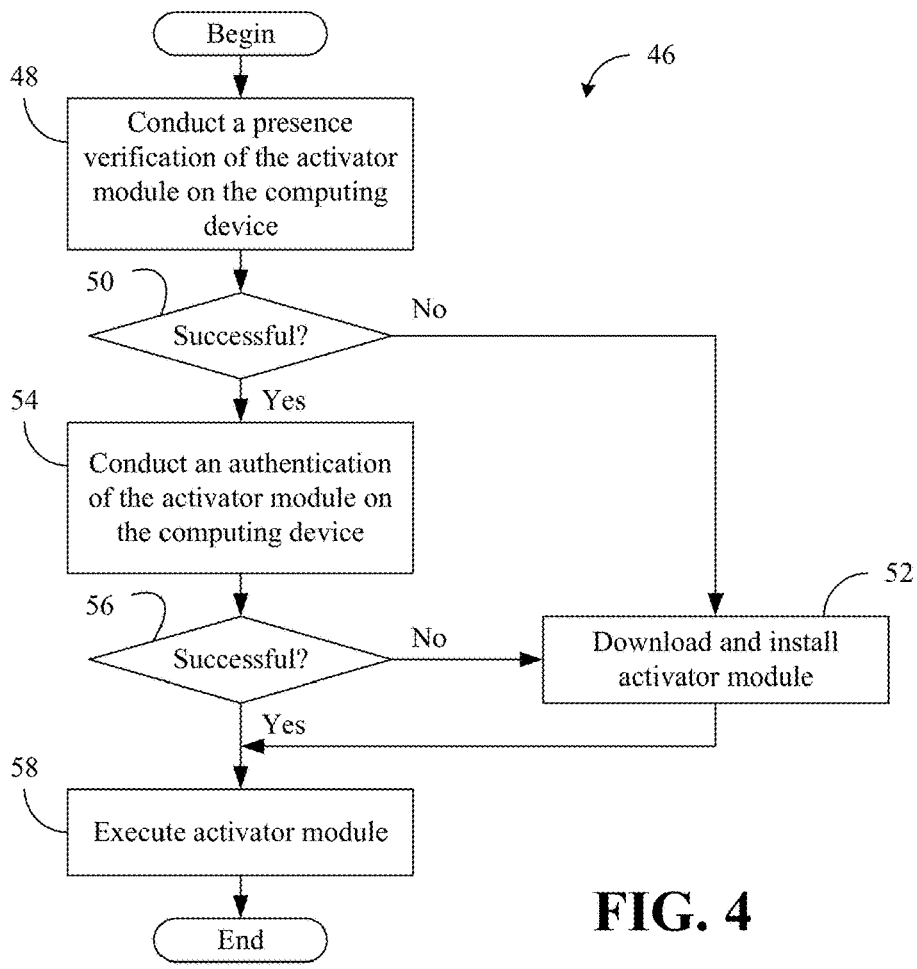
FIG. 4 is a flowchart of an example of a method of confirming the operability of an activator module according to an embodiment.

FIG. 4 shows a method 46 of confirming the operability of an activator module. Accordingly, the method 46, may incorporate one or more aspects of the block 42 (FIG. 3), and may be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof. Illustrated block 48 provides for conducting a presence verification of the activator module on the computing device. The presence verification may therefore determine whether the activator module has been, for example, deleted by a user of the computing device. If it is determined at block 50 that the presence verification has been unsuccessful, the activator module may be downloaded and installed by the loader module at block 52.

If, on the other hand, the presence verification is successful, illustrated block 54 conducts an authentication of the activator module. The authentication at block 54 may involve the exchange of digital signature information in order to establish a mutual trust between the loader module and the activator module. If it is determined at block 56 that the authentication has been unsuccessful, a replacement activator module may be downloaded and installed by the loader module at block 52. Illustrated block 58 provides for execution of the activator module, wherein the activator module may ensure that the appropriate service agents are installed on the computing device. For example, the activator module may also conduct a presence verification of the selected service agents, and download and/or reinstall any service agents whose presence cannot be verified. The activator module, and the service agents managed by the activator module, may therefore be considered persistent on the computing device in that any tampering or removal of the activator module or service agents may be detected and effectively reversed in real-time.

Figure 5:
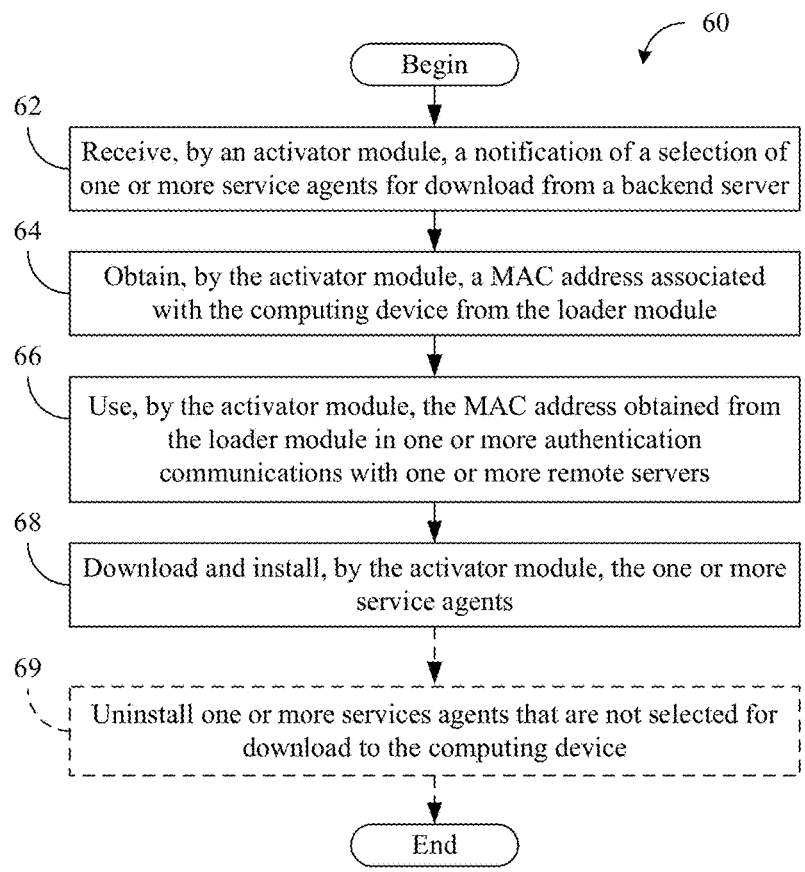
FIG. 5 is a flowchart of an example of a method of using an activator module to install one or more service agents on a computing device according to an embodiment.

Turning now to FIG. 5, a method 60 of using an activator module to install one or more service agents on a computing device is shown. Accordingly, the method 60, may incorporate one or more aspects of the block 44 (FIG. 3), and may be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof. Illustrated processing block 62 provides for receiving, by the activator module, a notification of a selection of one or more service agents for download, wherein the notification may be received from a backend server.

A MAC address may be obtained by the activator module from the loader module at block 64. The MAC address obtained from the loader module may be used, by the activator module, at block 66 in one or more authentication communications with one or more remote servers. Thus, the illustrated approach protects against MAC address spoofing by computing device users attempting to cause an authentication error and render one or more services inoperable. Block 68 may download and install, by the activator module, the one or more service agents. Block 68 may involve, for example, conducting a presence verification of the selected service agents, and downloading and/or reinstalling any service agents whose presence cannot be verified. In addition, illustrated block 69 may optionally provide for uninstalling one or more service agents that are not selected for download to the computing device.

Figure 6:
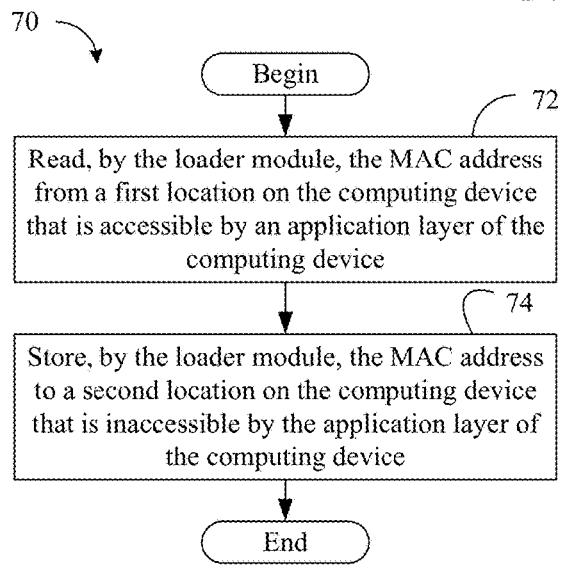
FIG. 6 is a flowchart of an example of a method of securing a MAC address according to an embodiment.

FIG. 6 shows a method 70 of securing a MAC address. The method 70 may be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof. Illustrated block 72 may provide for reading, by the loader module, the MAC address from a first location (e.g., device firmware/FW) on the computing device that is accessible by an application layer of the computing device. Block 74 may store, by the loader module, the MAC address to a second location on the computing device that is inaccessible by the application layer of the computing device. Thus, when the MAC address is supplied to the activator module in a processing block such as, for example, block 64 (FIG. 5), the activator module may be assured that the MAC address is trustworthy.

Figure 7:
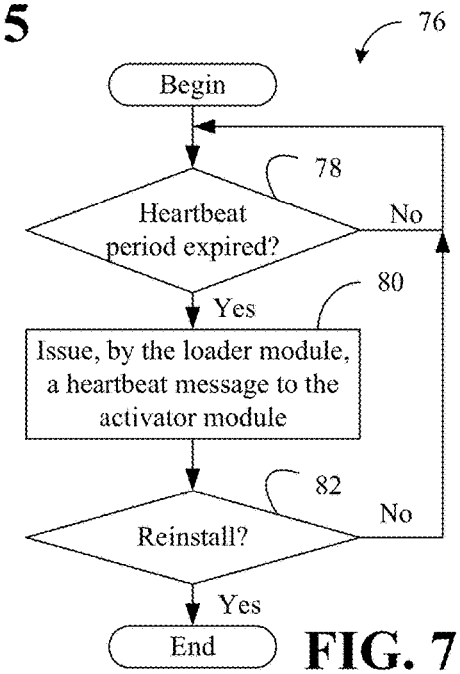
FIG. 7 is a flowchart of an example of a method of keeping an activator module alive according to an embodiment.

Turning now to FIG. 7, a method 76 of keeping an activator module alive is shown. The method 76 may be implemented as a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof. Illustrated processing block 78 determines whether a predetermined heartbeat period has expired. The predetermined heartbeat period may be an amount of time that is set based on a number of factors (e.g., security, power consumption, etc.), wherein one more tradeoffs may be made between those factors (e.g., shorter period may improve security while increasing power consumption, and so forth). If the heartbeat period has expired, block 80 may issue, by the loader module, a heartbeat message to the activator module. If no response to the heartbeat message is received from the activator module, the loader module might repeat an operability confirmation such as, for example, the operability confirmation of method 46 (FIG. 4), already discussed. Illustrated block 82 determines whether to reinstall the activator module and resume issuance of the heartbeat messages to the newly installed activator module.

Figure 8:
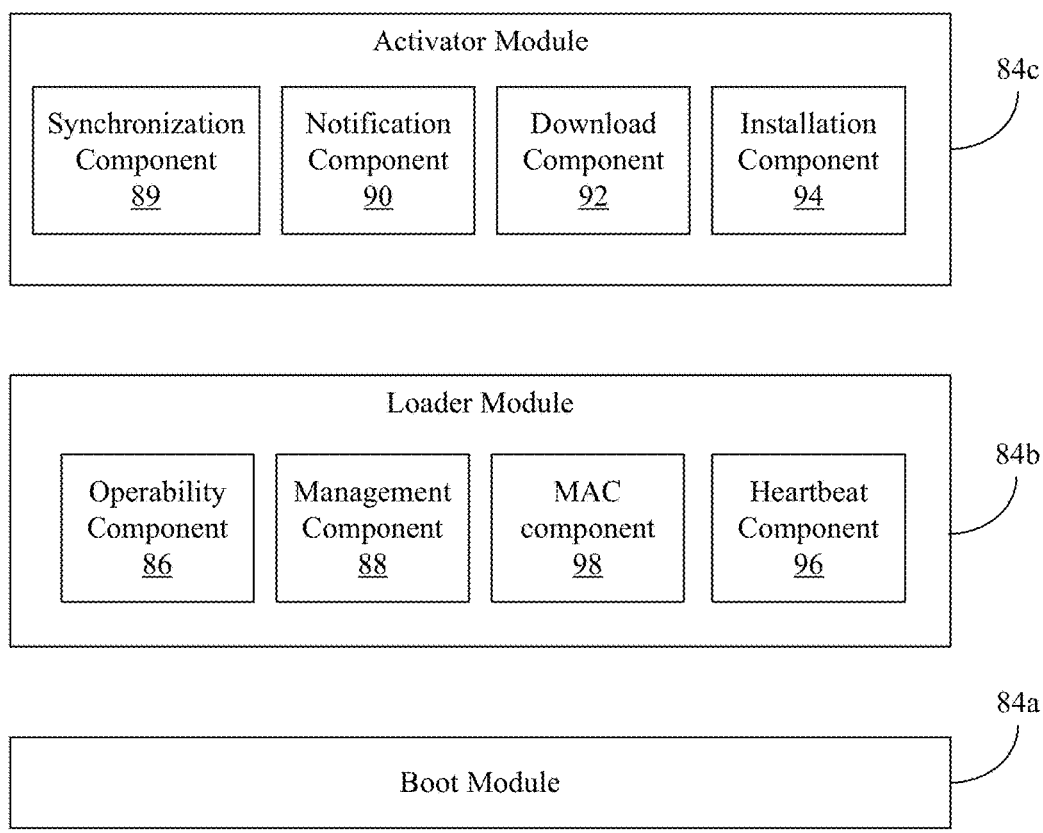
FIG. 8 is a block diagram of an example of a logic architecture according to an embodiment.

FIG. 8 shows a logic architecture 84 (84a-84c) that may be used to provision persistent, dynamic and secure elements on a computing device. The logic architecture 84 may therefore be readily substituted for the provisioner 26 (FIG. 1), already discussed. In the illustrated example, a boot module 84a (e.g., basic input output system/BIOS) invokes a loader module 84b from, for example, a factory image of the computing device, wherein the loader module 84b has administrative rights with respect to the computing device. The loader module 84b may include an operability component 86 that confirms the operability of an activator module 84c and a management component 88 that uses the activator module 84c to dynamically manage an installation status of one or more service agents on the computing device on demand.

For example, the operability component 86 may conduct a presence verification of the activator module 84c on the computing device, download the activator module 84c if the presence verification is unsuccessful, and install the activator module 84c on the computing device to confirm the operability of the activator module. The operability component 86 may also conduct an authentication of the activator module 84c, download a replacement activator module 84c to the computing device if the authentication is unsuccessful, and install the activator module on the computing device to confirm the operability of the activator module 84c.

The illustrated activator module 84c includes a synchronization component 89 to query a backend server for service agent selections. The activator module 84c may also include a notification component 90 to receive a notification of a selection of the one or more service agents for download from the backend server, and a download component 92 to download the one or more service agents to the computing device. As already noted, communications between the activator module 84c, the backend server and the third party servers providing the service agents may be enhanced with SSL, hashes, agent size comparisons, certificate pinning, and so forth. The illustrated activator module 84c also includes an installation component 94 to install the one or more service agents on the computing device. The installation component 94 may also conduct a presence verification of the selected agents, and download and/or reinstall any service agents whose presence cannot be verified. In addition, the installation component 94 may uninstall one or more service agents that are not selected for download to the computing device. In one example, the loader module 84b includes a heartbeat component 96 to issue a heartbeat message to the activator module 84c.

The loader module 84b may also include a MAC component 98 to read a MAC address from a first location on the computing device and store the MAC address to a second location on the computing device, wherein the first location is accessible by an application layer of the computing device and the second location is inaccessible by the application layer of the device. The second location may be considered a secured location due to its inaccessibility by the application layer. In this regard, the download component 92 of the activator module 84c may be configured to obtain the MAC address associated with the computing device from the loader module 84b, and use the MAC address obtained from the loader module 84b in one or more authentication communications with one or more remote servers. The loader component 84*a* and the activator component 84*c* may also automatically upgrade themselves when notified by the backend server.

Figure 9:
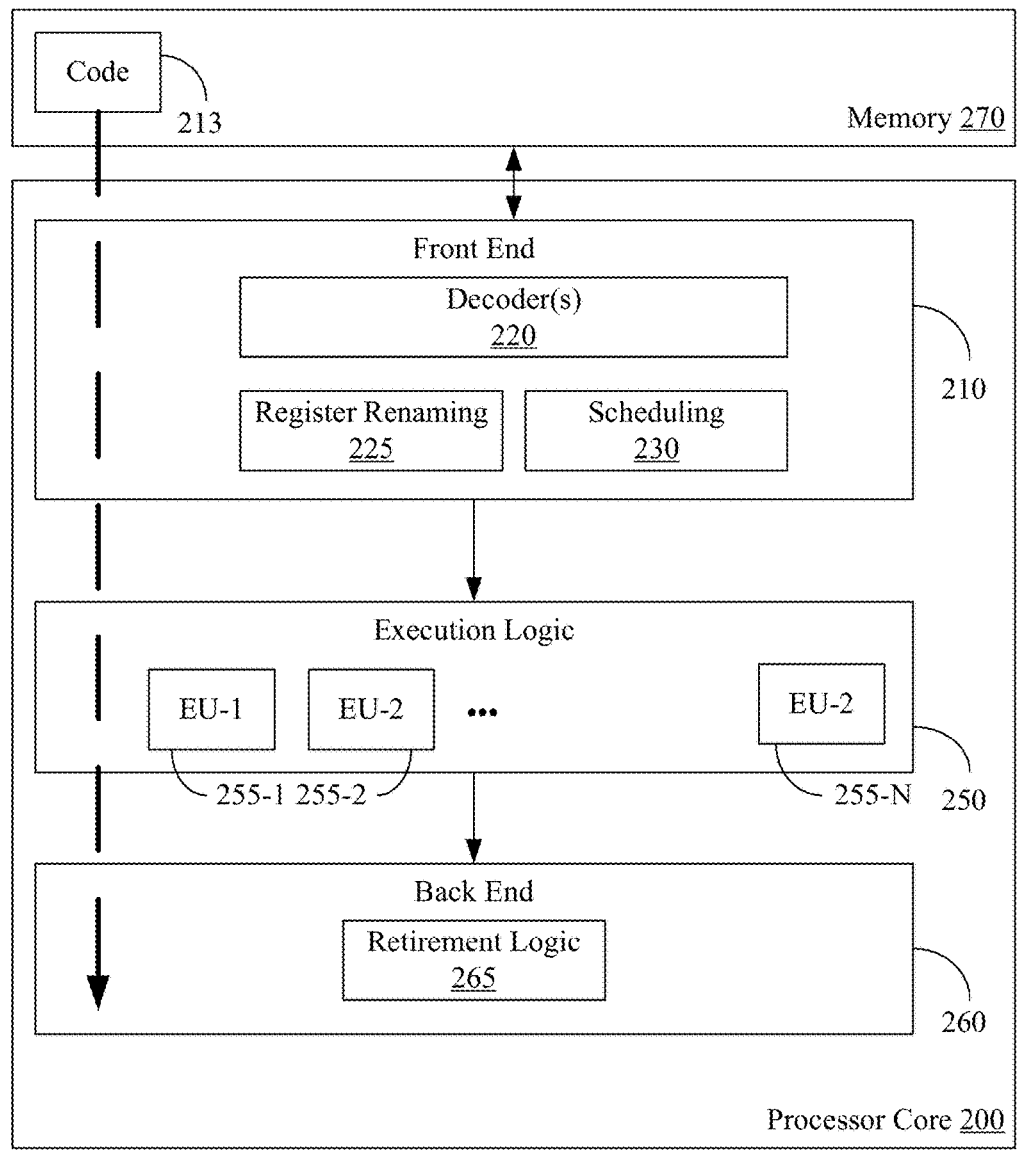
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 38 (FIG. 3), the method 46 (FIG. 4), the method 60 (FIG. 5), the method 70 (FIG. 6), and/or the method 76 (FIG. 7), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 10, shown is a block diagram of a system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074*a* and 1074*b* and processor cores 1084*a* and 1084*b*). Such cores 1074*a*, 1074*b*, 1084*a*, 1084*b* may be configured to execute instruction code in a manner similar to that discussed above in connection with FIG. 9.

Each processing element 1070, 1080 may include at least one shared cache 1896*a*, 1896*b*. The shared cache 1896*a*, 1896*b* may store data (e.g., instructions) that are utilized by one or more components of the processor, such as the cores 1074*a*, 1074*b* and 1084*a*, 1084*b*, respectively. For example, the shared cache 1896*a*, 1896*b* may locally cache data stored in a memory 1032, 1034 for faster access by components of the processor. In one or more embodiments, the shared cache 1896*a*, 1896*b* may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the method 38 (FIG. 3), the method 46 (FIG. 4), the method 60 (FIG. 5), the method 70 (FIG. 6), and/or the method 76 (FIG. 7), already discussed, and may be similar to the code 213 (FIG. 9), already discussed. Further, an audio I/O 1024 may be coupled to second bus 1020.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 may include a computing device to provision services, comprising an activator module and a loader module having administrative rights with respect to the computing device, the loader module including an operability component to confirm an operability of the activator module, and a management component to use the activator module to manage an installation status of one or more service agents on the computing device.

Example 2 may include the computing device of Example 1, wherein the operability component of the loader module is to conduct a presence verification of the activator module on the computing device, download the activator module to the computing device if the presence verification is unsuccessful, and install the activator module on the computing device to confirm the operability of the activator module.

Example 3 may include the computing device of Example 1, wherein the operability component of the loader module is to conduct an authentication of the activator module, download a replacement activator module if the authentication is unsuccessful, and install the replacement activator module on the computing device to confirm the operability of the activator module.

Example 4 may include the computing device of Example 1, wherein the activator module includes a synchronization component to query a backend server for service agent selections, a notification component to receive a notification of a selection of the one or more service agents for download from the backend server, a download component to download the one or more service agents to the computing device, and an installation component to install the one or more service agents on the computing device.

Example 5 may include the computing device of Example 4, wherein the download component of the activator module is to obtain a media access control (MAC) address associated with the computing device from the loader module, and use the MAC address obtained from the loader module in one or more authentication communications with one or more remote servers.

Example 6 may include the computing device of Example 5, wherein the loader module includes a MAC component to read the MAC address from a first location on the computing device that is accessible by an application layer of the computing device, and store the MAC address to a second location on the computing device that is inaccessible by the application layer of the computing device.

Example 7 may include the computing device of any one of Examples 1 to 6, wherein the loader module includes a heartbeat component to issue a heartbeat message to the activator module.

Example 8 may include the computing device of any one of Examples 1 to 6, further including a boot module to invoke the loader module from a factory image of the computing device.

Example 9 may include a method of provisioning services, comprising confirming, by a loader module having administrative rights with respect to a computing device, an operability of an activator module on the computing device. The method may also provide for using the activator module to manage an installation status of one or more service agents on the computing device.

Example 10 may include the method of Example 9, wherein confirming the operability of the activator module includes conducting a presence verification of the activator module on the computing device, downloading the activator module to the computing device if the presence verification is unsuccessful; and installing the activator module on the computing device.

Example 11 may include the method of Example 9, wherein confirming the operability of the activator module includes conducting an authentication of the activator module, downloading a replacement activator module to the computing device if the authentication is unsuccessful, and installing the replacement activator module on the computing device.

Example 12 may include the method of Example 9, wherein using the activator module to manage the installation status of the one or more service agents includes querying, by the activator module, a backend server for service agent selections, receiving, by the activator module, a notification of a selection of the one or more service agents for download from the backend server, downloading, by the activator module, the one or more service agents to the computing device, installing, by the activator module, the one or more service agents on the computing device, and uninstalling, by the activator module, one or more service agents that are not selected for download to the computing device.

Example 13 may include the method of Example 12, further including conducting, by the activator module, a presence verification of the one or more service agents on the computing device, wherein the downloading and installing is conducted for service agents whose presence cannot be verified on the computing device.

Example 14 may include the method of Example 12, further including obtaining, by the activator module, a media access control (MAC) address associated with the computing device from the loader module, and using, by the activator module, the MAC address obtained from the loader module in one or more authentication communications with one or more remote servers.

Example 15 may include the method of Example 14, further including reading, by the loader module, the MAC address from a first location on the computing device that is accessible by an application layer of the computing device, and storing, by the loader module, the MAC address to a second location on the computing device that is inaccessible by the application layer of the computing device.

Example 16 may include the method of any one of Examples 9 to 15, further including issuing, by the loader module, a heartbeat message to the activator module.

Example 17 may include the method of any one of Examples 9 to 15, further including invoking the loader module from a factory image of the computing device and upgrading one or more of the activator module or the loader module based on a notification from a backend server.

Example 18 may include at least one computer readable storage medium comprising a set of instructions which, when executed, cause a computing device to confirm, by a loader module having administrative rights with respect to the computing device, an operability of an activator module on the computing device. The instructions, when executed, may also cause the computing device to use the activator module to manage an installation status of one or more service agents on the computing device.

Example 19 may include the at least one computer readable storage medium of Example 18, wherein the instructions, when executed, cause the computing device to conduct a presence verification of the activator module on the computing device, download the activator module to the computing device if the presence verification is unsuccessful, and install the activator module on the computing device to confirm the operability of the activator module.

Example 20 may include the at least one computer readable storage medium of Example 18, wherein the instructions, when executed, cause the computing device to conduct an authentication of the activator module, download a replacement activator module if the authentication is unsuccessful, and install the replacement activator module on the computing device to confirm the operability of the activator module.

Example 21 may include the at least one computer readable storage medium of Example 18, wherein the instructions, when executed, cause the computing device to query, by the activator module, a backend server for service agent selections, receive, by the activator module, a notification of a selection of the one or more service agents for download from a backend server, download, by the activator module, the one or more service agents to the computing device, and install, by the activator module, the one or more service agents on the computing device to use the activator module to install the one or more service agents.

Example 22 may include the at least one computer readable storage medium of Example 21, wherein the instructions, when executed, cause the computing device to, obtain, by the activator module, a media access control (MAC) address associated with the computing device from the loader module, and use, by the activator module, the MAC address obtained from the loader module in one or more authentication communications with one or more remote servers.

Example 23 may include the at least one computer readable storage medium of Example 22, wherein the instructions, when executed, cause the computing device to, read, by the loader module, the MAC address from a first location on the computing device that is accessible by an application layer of the computing device, and store, by the loader module, the MAC address to a second location on the computing device that is inaccessible by the application layer of the computing device.

Example 24 may include the at least one computer readable storage medium of any one of Examples 18 to 23, wherein the instructions, when executed, cause the computing device to issue, by the loader module a heartbeat message to the activator module.

Example 25 may include the at least one computer readable storage medium of any one of Examples 18 to 23, wherein the instructions, when executed, cause the computing device to invoke the loader module from a factory image of the computing device.

Example 26 may include a computing device to provision services, comprising means for performing the method of any one of Examples 9 to 17.

Thus, techniques described herein may provide a flexible, low cost/overhead solution to securely installing and uninstalling multiple cloud based services on demand, keeping them resistant to unauthorized removal and/or deactivation attempts. The techniques may be useful in a wide variety of settings such as, for example, K-12 educational systems in developing countries, corporate computing infrastructures, small and medium-sized businesses (SMBs), and so forth.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A client computing device comprising:
a processor;
memory, cooperating with the processor;
an activator module to execute on the processor, the activator module to automatically:
periodically determine that an installation status of one or more service agents corresponding to one or more services on a remote device is correct; and
reinstall or uninstall the one or more service agents if the periodically determined installation status is incorrect; and
a loader module separate and independent of the activator module, the loader module to execute on the processor, the loader module having administrative rights with respect to the client computing device, the loader module including:
an operability component to confirm an operability of the activator module; and
a management component to use the activator module to manage the installation status of the one or more service agents on the client computing device wherein the loader module is to periodically conduct a presence verification or authentication of the activator module, download the activator module if the presence verification or authentication is unsuccessful, and install the activator module on the client computing device to confirm the operability of the activator module.

2. The client computing device of claim 1, wherein the activator module includes:
a synchronization component to query a backend server for service agent selections;
a notification component to receive a notification of a selection of the one or more service agents for download from the backend server;
a download component to download the one or more service agents to the client computing device; and
an installation component to install the one or more service agents on the client computing device.

3. The client computing device of claim 2, wherein the download component of the activator module is to:
obtain a media access control (MAC) address associated with the client computing device from the loader module, and
use the MAC address obtained from the loader module in one or more authentication communications with one or more remote servers.

4. The client computing device of claim 3, wherein the loader module includes a MAC component to read the MAC address from a first location on the client computing device that is accessible by an application layer of the client computing device, and store the MAC address to a second location on the client computing device that is inaccessible by the application layer of the client computing device.

5. The client computing device of claim 1, wherein the loader module includes a heartbeat component to issue a heartbeat message to the activator module.

6. The client computing device of claim 1, further including a boot module to invoke the loader module from a factory image of the client computing device.

7. A method comprising:
periodically confirming, by a loader module of a client computing device having administrative rights with respect to the client computing device, an operability of an activator module on the client computing device, the loader module being separate and independent of the activator module; and
using the activator module to automatically manage an installation status of one or more service agents on the client computing device corresponding to one or more services on a remote device by:
periodically determining that the installation status of the one or more service agents is correct; and
reinstalling or uninstalling the one or more service agents if the periodically determined installation status is incorrect;
wherein confirming the operability of the activator module includes:
conducting a presence verification or authentication of the activator module on the client computing device;
downloading the activator module to the client computing device if the presence verification or authentication is unsuccessful; and
installing the activator module on the client computing device.

8. The method of claim 7, wherein using the activator module to manage the installation status of the one or more service agents includes:
querying, by the activator module, a backend server for service agent selections;
receiving, by the activator module, a notification of a selection of the one or more service agents for download from the backend server;
downloading, by the activator module, the one or more service agents to the client computing device;
installing, by the activator module, the one or more service agents on the client computing device; and
uninstalling, by the activator module, one or more service agents that are not selected for download to the client computing device.

9. The method of claim 8, further including conducting, by the activator module, a presence verification of the one or more service agents on the client computing device, wherein the downloading and installing is conducted for service agents whose presence cannot be verified on the client computing device.

10. The method of claim 8, further including:
obtaining, by the activator module, a media access control (MAC) address associated with the client computing device from the loader module; and
using, by the activator module, the MAC address obtained from the loader module in one or more authentication communications with one or more remote servers.

11. The method of claim 10, further including:
reading, by the loader module, the MAC address from a first location on the client computing device that is accessible by an application layer of the client computing device; and
storing, by the loader module, the MAC address to a second location on the client computing device that is inaccessible by the application layer of the client computing device.

12. The method of claim 7, further including issuing, by the loader module, a heartbeat message to the activator module.

13. The method of claim 7, further including:
invoking the loader module from a factory image of the client computing device; and
upgrading one or more of the activator module or the loader module based on a notification from a backend server.

14. At least one non-transitory computer readable storage medium comprising a set of instructions which, when executed, cause a client computing device comprising a processor and memory cooperating with the processor to:
periodically confirm, by a loader module to execute on the processor of the client computing device having administrative rights with respect to the client computing device, an operability of an activator module on the client computing device, the loader module being separate and independent of the activator module; and
use the activator module to execute on the processor to automatically manage an installation status of one or more service agents on the client computing device corresponding to one or more services on a remote device by:
periodic determination that the installation status of the one or more service agents is correct; and
reinstallation or uninstallation of the one or more service agents if the periodic determination is that the installation status is incorrect;
conduct a presence verification or authentication of the activator module on the client computing device;
download the activator module to the client computing device if the presence verification or authentication is unsuccessful; and
install the activator module on the client computing device to confirm the operability of the activator module.

15. The at least one computer readable storage medium of claim 14, wherein the instructions, when executed, cause the client computing device to:
query, by the activator module, a backend server for service agent selections;
receive, by the activator module, a notification of a selection of the one or more service agents for download from the backend server;
download, by the activator module, the one or more service agents to the client computing device; and
install, by the activator module, the one or more service agents on the client computing device to use the activator module to install the one or more service agents.

16. The at least one computer readable storage medium of claim 15, wherein the instructions, when executed, cause the client computing device to:
obtain, by the activator module, a media access control (MAC) address associated with the client computing device from the loader module; and
use, by the activator module, the MAC address obtained from the loader module in one or more authentication communications with one or more remote servers.

17. The at least one computer readable storage medium of claim 16, wherein the instructions, when executed, cause the client computing device to:
read, by the loader module, the MAC address from a first location on the client computing device that is accessible by an application layer of the client computing device; and
store, by the loader module, the MAC address to a second location on the client computing device that is inaccessible by the application layer of the client computing device.

18. The at least one computer readable storage medium of claim 14, wherein the instructions, when executed, cause the client computing device to issue, by the loader module a heartbeat message to the activator module.

19. The at least one computer readable storage medium of claim 14, wherein the instructions, when executed, cause the client computing device to invoke the loader module from a factory image of the client computing device.

* * * * *